(12) United States Patent  
Little et al.

(10) Patent No.: US 7,949,422 B1  
(45) Date of Patent: May 24, 2011

(54) MACHINE TOOL CONTROL SYSTEM

(75) Inventors: Robby J. Little, South Londonderry, VT (US); Jeffrey P. Ramen, Brattleboro, VT (US); David W. Lauzon, Springfield, VT (US); Philip H. Caron, Springfield, VT (US); Richard L. Desbiens, Newport, NH (US)

(73) Assignee: Vermont Machine Tool Corporation, Springfield, VT (US)

( * ) Notice: Subject to any disclaimer, the term of this patent is extended or adjusted under 35 U.S.C. 154(b) by 552 days.

(21) Appl. No.: 11/767,184

(22) Filed: Jun. 22, 2007

(51) Int. Cl.
*G06F 19/00* (2011.01)
*G06F 9/44* (2006.01)

(52) U.S. Cl. ............ 700/180; 700/17; 700/83; 700/181; 700/182; 715/764; 717/113

(58) Field of Classification Search .................... 700/17, 700/83, 180–182; 715/764, 763, 771; 717/113
See application file for complete search history.

(56) References Cited

U.S. PATENT DOCUMENTS

| | | | | |
|---|---|---|---|---|
| 4,455,619 A * | 6/1984 | Masui et al. | ................... | 345/530 |
| 4,852,047 A * | 7/1989 | Lavallee et al. | ................ | 700/86 |
| 5,437,007 A * | 7/1995 | Bailey et al. | ................ | 715/763 |
| 5,465,215 A * | 11/1995 | Strickland et al. | ........... | 700/180 |
| 5,485,620 A * | 1/1996 | Sadre et al. | ................... | 717/162 |
| 5,619,694 A * | 4/1997 | Shimazu | ....................... | 725/145 |
| 5,715,429 A * | 2/1998 | Takizawa et al. | ................. | 703/7 |
| 5,732,277 A * | 3/1998 | Kodosky et al. | ............. | 717/125 |
| 5,862,379 A * | 1/1999 | Rubin et al. | ................... | 717/109 |
| 5,896,290 A * | 4/1999 | Katsuta et al. | ................. | 700/83 |
| 5,933,353 A * | 8/1999 | Abriam et al. | ................ | 700/182 |
| 5,940,294 A * | 8/1999 | Dove | .............................. | 700/83 |
| 5,940,296 A * | 8/1999 | Meyer | ............................ | 700/83 |
| 6,055,369 A * | 4/2000 | Sawahata et al. | ............ | 717/109 |
| 6,112,133 A * | 8/2000 | Fishman | ....................... | 700/182 |
| 6,236,399 B1 * | 5/2001 | Nishiyama et al. | ........... | 715/810 |
| 6,298,474 B1 * | 10/2001 | Blowers et al. | ............... | 717/104 |
| 6,366,300 B1 * | 4/2002 | Ohara et al. | .................. | 715/771 |
| 6,421,821 B1 * | 7/2002 | Lavallee | ....................... | 717/109 |
| 6,564,368 B1 * | 5/2003 | Beckett et al. | ................ | 717/113 |
| 6,671,572 B1 * | 12/2003 | Craft et al. | .................... | 700/184 |

(Continued)

OTHER PUBLICATIONS

Julio Garrido Campos, Martin Hardwick, A traceability information model for CNC manufacturing, Computer-Aided Design, vol. 38, Issue 5, May 2006, pp. 540-551.*

(Continued)

*Primary Examiner* — Albert Decady
*Assistant Examiner* — Dave Robertson
(74) *Attorney, Agent, or Firm* — DeLio & Peterson, LLC; Peter W. Peterson

(57) ABSTRACT

A machine tool control system. A machine tool controller is provided to receive commands from an input source and provide control instructions to a machine tool based at least in part on the commands. An operator interface is provided for inputting commands to the controller. The interface includes a display screen having images of individual command functions, the images being selectable on the screen to place into a sequence of command functions selected by an operator. A sequence generator indicates sequential ordering of the command functions represented by the sequence of images on the screen, such that a sequence of images on the screen selected by the operator is translated by the operator controller sequence generator into a sequence of commands to be inputted into the controller. The operator interface may include one or more images each representing a plurality of individual command functions in a defined sequence.

25 Claims, 13 Drawing Sheets

U.S. PATENT DOCUMENTS

| | | | |
|---|---|---|---|
| 6,671,869 B2 * | 12/2003 | Davidson et al. | 716/17 |
| 6,741,905 B1 * | 5/2004 | Fishman et al. | 700/180 |
| 6,779,175 B2 * | 8/2004 | Susnjara | 717/136 |
| 6,784,902 B1 * | 8/2004 | Melder et al. | 715/771 |
| 6,795,748 B2 * | 9/2004 | Hammer et al. | 700/181 |
| 6,802,053 B1 * | 10/2004 | Dye et al. | 717/113 |
| 6,845,275 B2 * | 1/2005 | Gasiorek et al. | 700/26 |
| 6,981,226 B2 * | 12/2005 | Schmitt et al. | 715/764 |
| 7,000,191 B2 * | 2/2006 | Schmitt et al. | 715/764 |
| 7,076,332 B2 * | 7/2006 | Cifra et al. | 700/245 |
| 7,089,531 B2 * | 8/2006 | Rutkowski | 717/113 |
| 7,155,298 B2 * | 12/2006 | Rutkowski | 700/87 |
| 7,159,183 B1 * | 1/2007 | Kudukoli et al. | 715/762 |
| 7,302,676 B2 * | 11/2007 | Schmitt et al. | 717/132 |
| 7,308,334 B2 * | 12/2007 | Tasker et al. | 700/180 |
| 7,340,715 B2 * | 3/2008 | Liu | 717/105 |
| 7,367,017 B2 * | 4/2008 | Maddocks et al. | 717/115 |
| 7,474,925 B2 * | 1/2009 | Renner | 700/17 |
| 7,505,817 B2 * | 3/2009 | McDaniel et al. | 700/18 |
| 2002/0054099 A1 * | 5/2002 | Schmitt et al. | 345/762 |
| 2003/0222912 A1 * | 12/2003 | Fairweather | 345/763 |
| 2004/0210868 A1 * | 10/2004 | Dutsch et al. | 717/113 |

OTHER PUBLICATIONS

X.W. Xu, S.T. Newman, Making CNC machine tools more open, interoperable and intelligent—a review of the technologies, Computers in Industry, vol. 57, Issue 2, Feb. 2006, pp. 141-152.*

Mark Albert. (Nov. 1997). Software is the CNC. Modern Machine Shop, 70(6), 60.*

Kolluri, S. P. and Tseng, A. A. 1989. Simulation of CNC controller features in graphics-based programming. Computers in Industry. 11, 2 (Jan. 1989), Abstract only.*

* cited by examiner

MACHINE TOOL CONTROL SYSTEM

BACKGROUND OF THE INVENTION

1. Field of the Invention

The present invention relates to a control system and method of controlling a machine tool.

2. Description of Related Art

Computer numerically controlled (CNC) or other programmable machine tools have long been know to machine parts based on programmed inputs. Such machine tools generally employ grinding or cutting tools, and include grinders, lathes, broaches, drills, milling machines and the like. The operators of the machine tools are required to input the specific information and commands that a machine tool is to execute to make a part. Prior art systems for input of such information and commands have not been easy to use. Problems have included the complexity of programs for inputting information and commands, the inability to access all of the devices on the machine tool, the lack of flexibility of pre-programmed cycles of commands, and the inability to use such systems on a variety of different machine tools. Because of the complexity and wide variety of programmable machine tools, there is a need to reduce the aforementioned problems.

SUMMARY OF THE INVENTION

Bearing in mind the problems and deficiencies of the prior art, it is therefore an object of the present invention to provide a machine tool control system that reduces the complexity of programming required for inputting information and commands.

It is another object of the present invention to provide a machine tool control system that is able to access substantially all of the devices on the machine tool.

A further object of the invention is to provide a machine tool control system that increases flexibility of programmed cycles of commands.

It is yet another object of the present invention to provide a machine tool control system that is able to be used on a variety of different machine tools.

Still other objects and advantages of the invention will in part be obvious and will in part be apparent from the specification.

The above and other objects, which will be apparent to those skilled in the art, are achieved in the present invention which is directed to a method of controlling a machine tool comprising providing a machine tool controller adapted to receive commands from an input source and provide control instructions to a machine tool based at least in part on the commands, and providing an operator interface for inputting commands to the controller. The interface includes a display screen having images thereon of individual command functions, the images being selectable on the screen to place into a sequence of command functions selected by an operator. The interface further includes a sequence generator to indicate sequential ordering of the command functions represented by the sequence of images on the screen. The method then includes selecting a plurality of images representing the command functions that the operator desires to have performed by the machine tool, and designating a sequence of the images on the screen representing the order in which the operator desires the machine tool to perform the selected command functions. Using the operator controller sequence generator, the method subsequently includes translating the designated sequence of selected images into a sequence of commands and inputting the sequence of commands into the controller to control the machine tool to perform the selected command functions in the order designated by the operator.

The images of individual command functions are preferably initially provided in a menu visible on a portion of the display screen, and the method includes copying the selected images from the menu onto another portion of the screen. The operator indicates on the display screen the designated order of the selected images in the order in which the operator desires the machine tool to perform the selected command functions. One or more of the operator interface images may represent a plurality of individual command functions in a defined sequence.

The method preferably further includes using the sequence generator to generate connector lines visible on the display screen connecting the sequence of selected images in the order designated by the operator. The connector lines visible on the display screen are preferably drawn to avoid images other than the selected images.

The method may further include providing on the interface display screen a graphical display of one or more operations being executed by the machine, such that the graphical display of operation sequence is automatically scrolled on the display screen during programmed operation of the commands. The method also may include providing on the interface display screen a graphical display of multiple input parameters to the machine tool as a function of time of operation of the machine tool, such as a line or bar graph, with the time scale being adjustable by the operator.

In a preferred embodiment, a compiler is used to convert the sequence of commands to G-code usable by a numerical control module of the machine tool.

The operator controller sequence generator may translate the designated sequence of selected images into a sequence of commands off line from the machine tool. The designated sequence of selected images representing the sequence of commands may also be transmitted to the controller over a network.

The present invention may also provide a method of controlling a machine tool comprising providing a machine tool controller adapted to receive commands from an input source and provide control instructions to a machine tool based at least in part on the commands, and providing an operator interface for inputting commands to the controller. The operator interface may create in a file a history log of machine operation or alarm events. The number and size of each history file are limited, as are the number of events stored in each history file. When the number of history files is exceeded, the method includes overwriting the oldest history file.

In another aspect, the present invention is directed to a control system for a machine tool comprising a machine tool controller adapted to receive commands from an input source and provide control instructions to a machine tool based at least in part on the commands, and an operator interface for inputting commands to the controller. The interface includes a display screen having images thereon of individual command functions, the images being selectable on the screen to place into a sequence of command functions selected by an operator. The interface further includes a sequence generator to indicate sequential ordering of the command functions represented by the sequence of images on the screen, such that a sequence of images on the screen selected by the operator is translated by the operator controller sequence generator into a sequence of commands to be inputted into the controller. The operator interface may include one or more images each representing a plurality of individual command functions in a defined sequence.

Preferably, the images of individual command functions are initially provided in a menu visible on a portion of the display screen. The sequence generator is further adapted to generate connector lines visible on the display screen connecting the images in the sequence selected by the operator. The connector lines visible on the display screen preferably avoid images other than the selected images.

The control system is preferably adapted to provide on the interface display screen a graphical display one or more operations being executed by the machine, wherein the graphical display of operation sequence is automatically scrolled on the display screen during programmed operation of the commands.

The control system may further provide on the interface display screen a graphical display, e.g., a line or bar graph, of multiple input parameters to the machine tool as a function of time of operation of the machine tool, wherein the time scale is adjustable by the operator.

More preferably, the system includes a compiler adapted to convert the sequence of commands to G-code usable by a numerical control module of the machine tool. Also, the operator controller sequence generator may be adapted to translate the designated sequence of selected images into a sequence of commands off line from the machine tool.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

Figure 1:
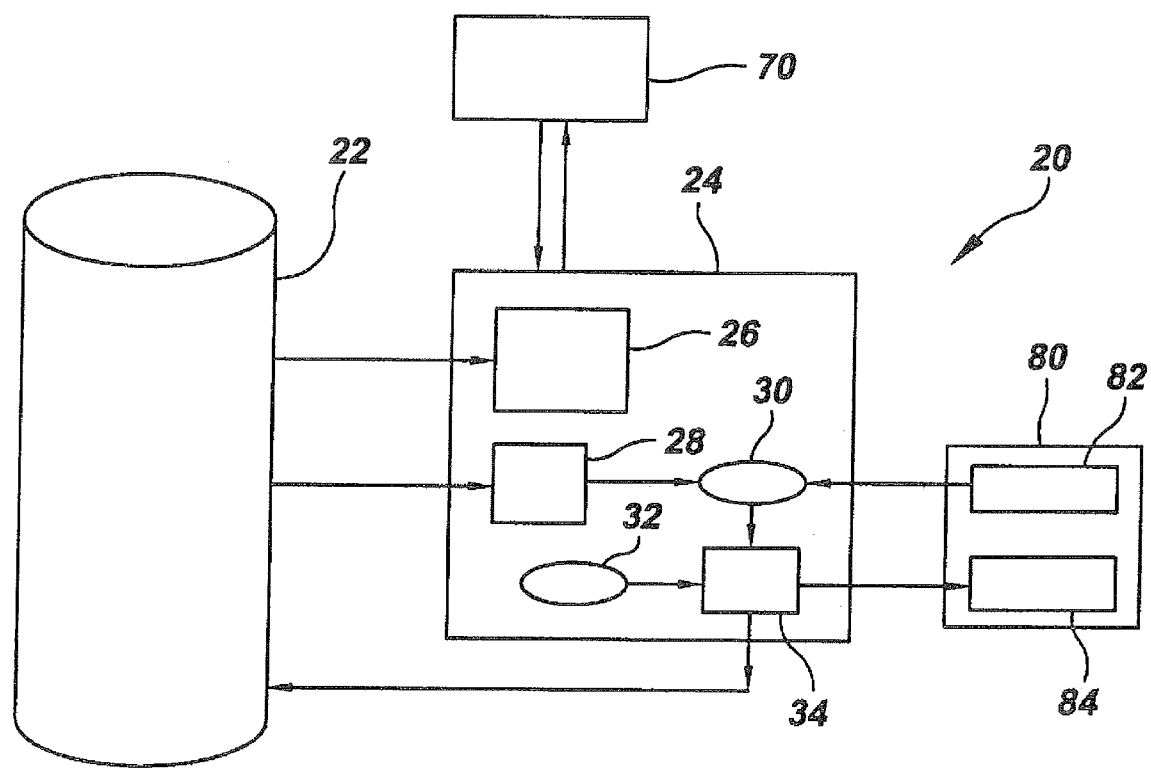
FIG. 1 is a schematic view of the preferred machine tool operator interface or control system of the present invention.

In describing the preferred embodiment of the machine tool control system of the present invention, reference will be made herein to FIGS. 1-13 of the drawings in which like numerals refer to like features of the invention. As shown in FIG. 1, the machine tool control system 20 includes an operator interface or control 80 with an operator user terminal 80 having an input device 82 and a visual display device 84 having a programmer screen, and a hard drive data storage device 22. Storage device 22 may comprise any device for storing electronic data (including computer programs), such as a semiconductor chip, a read-only memory, magnetic media such as a diskette or computer hard drive, or optical media such as a CD or DVD ROM. The storage device may be local to the operator interface 80 or may be available over a network. Operator interface control 24 includes a microprocessor for executing programs and other operations described below, as well as any required memory for programs, data and other information required for executing its tasks. The control system is connected to a machine tool 70 to be controlled. Such machine tool 70 may be any computer numerically controlled (CNC) or otherwise programmable machine tools such as a grinder, lathe, broach, drill, gear shaper, hobbing machine, hone, milling machine, shaper, or any other machine tool that uses single or multiple edge cutting tools, grinding or electrical discharge machining (EDM). CNC machines generally employ a programming language known as G-code to control the tool.

The system 20 preferably requires users to login on input device 82 with their name and password before the machine can be operated. Input device 82 may include a keyboard terminal as well as a graphical user interface on a terminal display used with a mouse, touch pad or touch sensitive screen. A disk 22 file lists users, their passwords, and their access levels, which are transmitted to a user data memory section 28 accessed by a verification program 30 on interface controller 24. The system checks user login information against the user, password and access level information from the disk file, and limits the operator's use of the available control functions according to the indicated access level. Accessing an internal clock 32, the system then outputs the time and aforementioned login data 34 to the user display 84, and saves a history record of such time and login data to disk storage 22. The system control may be configured for different user levels, such as machine tool operator, setup, maintenance, programmer, and engineer, with different restrictions on the types of functions or interactions permitted to each user level.

Also available from disk storage 22 are configuration and setup files containing data on the machine tool 70 and the different devices thereon, which information may be transferred into memory 26 on interface control 24 at the time the system is started up. This data is then available during subsequent setup and running of the machine tool.

Figure 2:
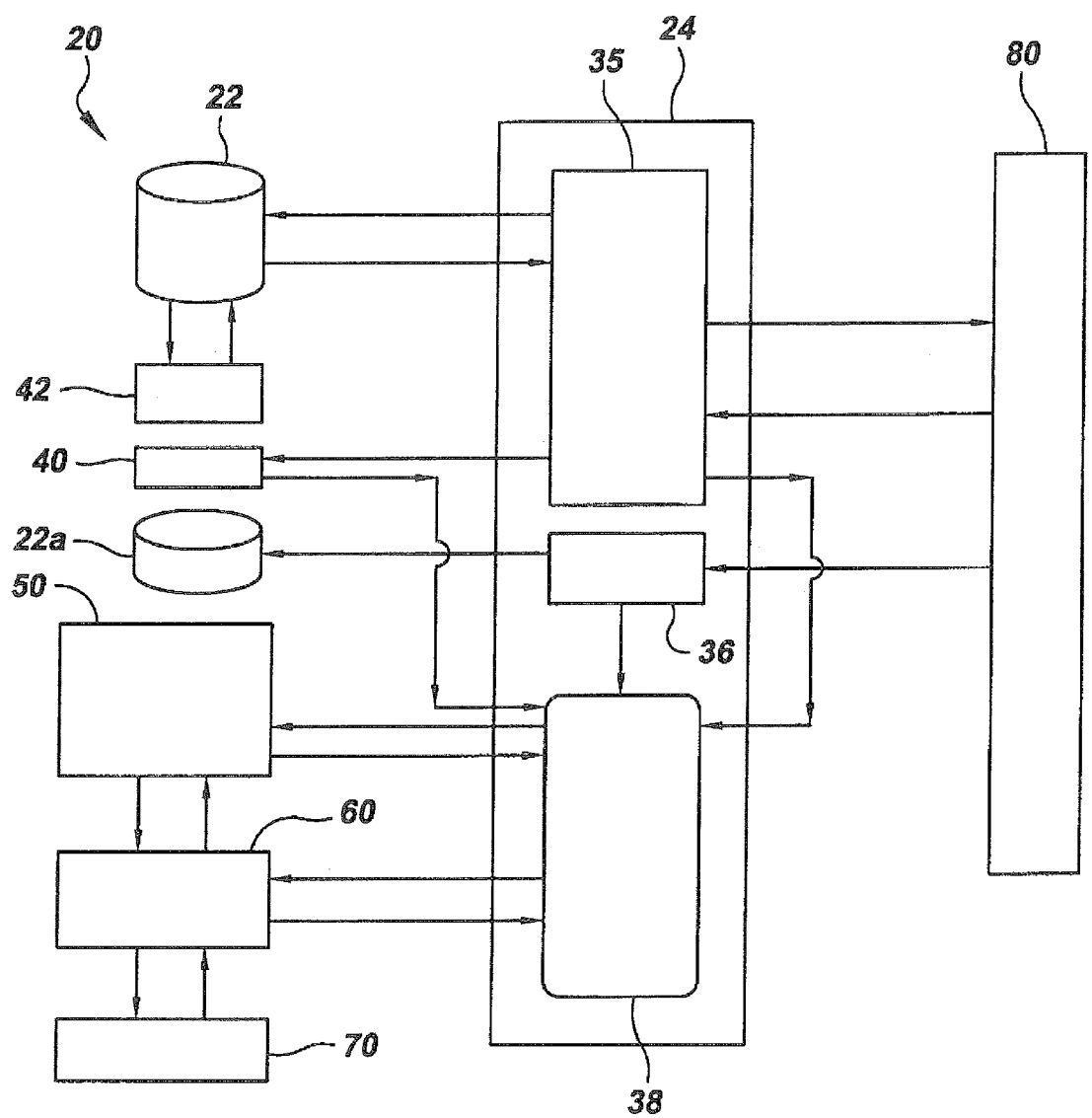
FIG. 2 is a schematic view of additional components of the operator interface of FIG. 1 in conjunction with a numerically controlled machine tool.

Referring to FIG. 2, after login when system 20 initially starts it reads files on disk drive 22 to determine what information to display to the user relative to the machine tool 70 being controlled. The files list any hardware and software that were purchased with the machine tool, as well as features of the system that can be pre-configured by the user. Preferably, the system only displays information relating to the use of the purchased items as configured. In an automatic configuration mode, the system may also list the paths available on the machine (i.e., simultaneous separate sequences of operation of the different devices that are separately controllable), the different axes of the devices, and the units of measure to be used. The files also include the latest version of the part program, which includes the data for the part to be produced and the steps needed by the machine to make the part, and will be described further below.

Preferably, machine tool 70 controlled by the system of the present invention is one that includes a numerical control (NC) module 50 and a programmable machine control (PMC) module 60 controlling the tool, such as those made under the Fanuc brand by General Electric Company of Fairfield, Conn. The PMC module 60 accesses the drives that run the motors and moves the slides and other devices on the machine tool, and handles the digital and analog inputs and outputs to the different devices on the machine tool. The NC module 50 contains the G-code interpreter that performs the calculations and interpolations and, in conjunction with the PMC module, commands the required movements on the machine tool. A library 38 stored on the operator interface control 24 contains software routines that interface with and provide direction to the NC and PMC modules, 50, 60.

To set up control of the particular machine tool 70, the programmer software 42 is an executable program when it is commanded by the operator interface 24 as a result of operator input via user terminal 80. This programmer software, whose operation will be explained further below, enables the operator user to easily program the desired commands and their sequence into the machine tool. It does so by creating a part program, which is stored as a copy in the working program memory 35. On start up, the latest version of the part program from disk storage 22 is loaded to both programmer software 42 and memory 35. The programmer software 42 (including the algorithm for drawing control lines described below) and part program, as well as the other methods for controlling a machine tool described herein, may be implemented by a computer program or software incorporating the process steps and instructions described above in otherwise conventional program code and stored on an otherwise conventional program storage device of the types described above. The working part program in memory 35 may store modifications that can be transmitted to disk storage 22, based on any changes permitted by the different user levels. Such modifications will also be transmitted to programmer software 42 with the remainder of the part program from disk 22.

The setup operations include those specific to the type of machine tool 70 being controlled. Disk 22 may store part manufacturing programs specific to the machine tool being used and to the part being machined, including the latest program previously received from the controller memory 35. After the operator user inputs to the working program structure 35 such information as desired program name, such saved programs may then be loaded into the working program structure in memory 35, and optionally renamed.

Operation setup using the terminal 80 requires input by the operator of the desired operations and sequence to be performed by machine tool 70. These include per path cycle programs, i.e., sequence of operations, that command each different and separately programmable device (or path) available on the machine tool. Also input is the particular device set up, and the operation setup for that device. For example, in the case where a grinder tool is being controlled, the device or tool setup would include establishing parameters for tool offsets; new wheel dressing; used wheel definition; manual operation of slides such as per axis reference setting, per axis slide jog, per axis handwheel jog and per axis incremental feed; and manual operation of devices such as dressing and loading.

Also, users can manually move the axes of the machine to define exact positions at which selected operations will be required to execute during automatic operation. The operator user inputs to the working program structure 35 such information as verification of tool device positions. The program 35 displays to the user on terminal 80 such information as cycle grid and selection, operation details table, position captures and simulation commands. In the case of selected cycles, users are also able to set selected operations to be skipped in the sequence during automatic operation.

In addition to permitting the operator to designate specific operations to be performed by the machine tool, the method and system of the present invention facilitate automatic machine control as groups of frequently repeated sequences of specific operations, referred to as cycles. In turn, collections of cycles required for the machine tool to produce particular parts are referred to as part programs. Information for automatic control is organized in a hierarchical format. Part programs are typically made up of one or more cycles. Each of the sequence of operations contains details defining what the machine is to do, when, how, and with what. The cycles needed, their respective sequences of operations, and all the operational details may be entered into the control system 20 by the user, and saved on disk storage 22 for later use.

The method and system of machine tool control of the present invention supports frequently used tool, operation and other setup functions via a graphical display of the sequence of operations contained in the currently selected cycle, along with a representation of the details associated with any selected function from the graphical or visual display 84. The programmer software 42 loaded into working program structure 35 accesses the configuration and setup files 26 containing the machine tool data (FIG. 1) in the operator interface control 24, and generates the flowchart images on programmer screen described below. The part program from disk 22 loaded into working program structure 35 may be modified by the device set up, operation setup and other inputs from user terminal 80 in creating a desired part program for the machine tool. Any devices that are on the machine tool, or that are later added to the machine tool, can be accommodated by the control system of the present invention.

The programmer screen displays a menu of the devices available to be programmed on the machine tool. A menu also includes images of icons of templates of specific operations to be performed by the devices on the machine tool, or commands for cycles, i.e., often-repeated sequences of specific operations. These available listed command templates may be copied by the user from the menu portion of the display screen to the working portion in the desired sequence of the operations or cycles to create a part program for a selected machine tool device. The user may also create custom-designed cycles designating new sequences of specific operations, and create command icons for such cycles. These commands are then selected along with the other listed commands.

After selecting and moving the command or programmed cycle icons to the working portion of the screen, the operator user designates the sequence in which the commands for the part program are to be executed by the machine tool. The icons may be designated in a particular sequence even if they are not arranged in that sequence.

Figure 3:
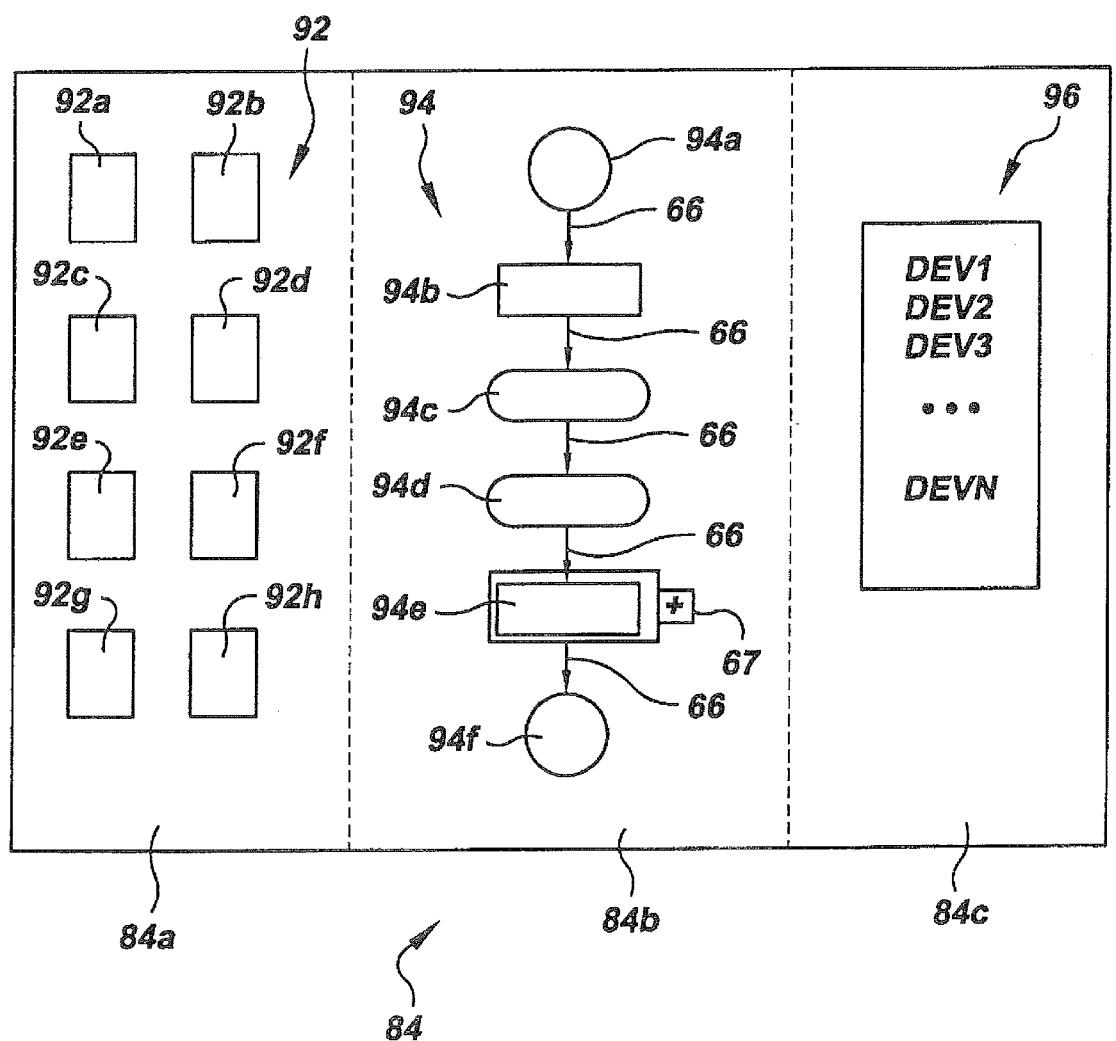
FIGS. 3-5 are views of the preferred programmer screen for the operator interface showing icons representing types of commands for machine device operations in conjunction with a flowchart showing sequential ordering of the command functions, the insertion of a new icon into the flowchart, and the designation of the desired specific machine device operation for the icon.
Figure 4:
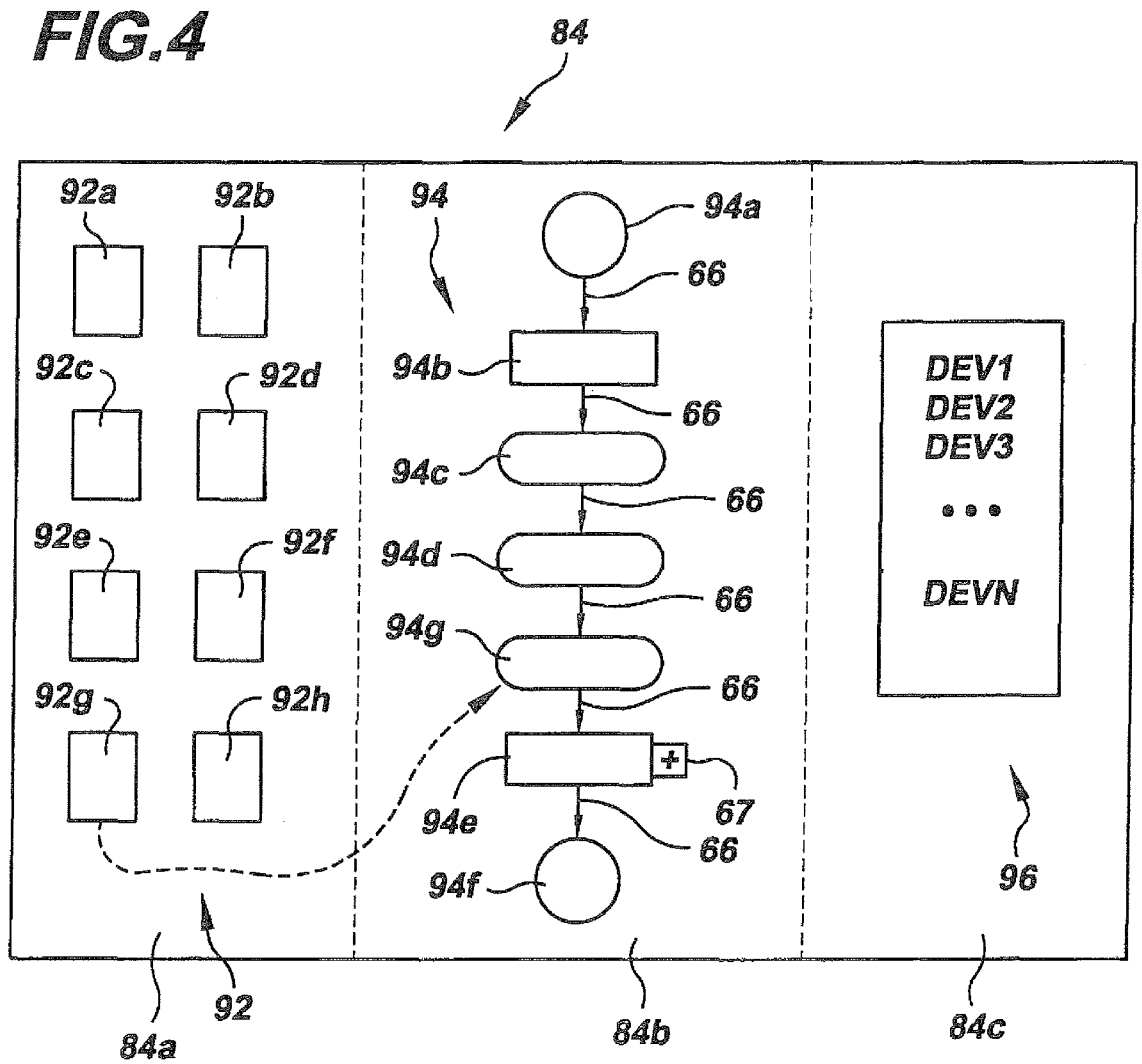
Figure 5:
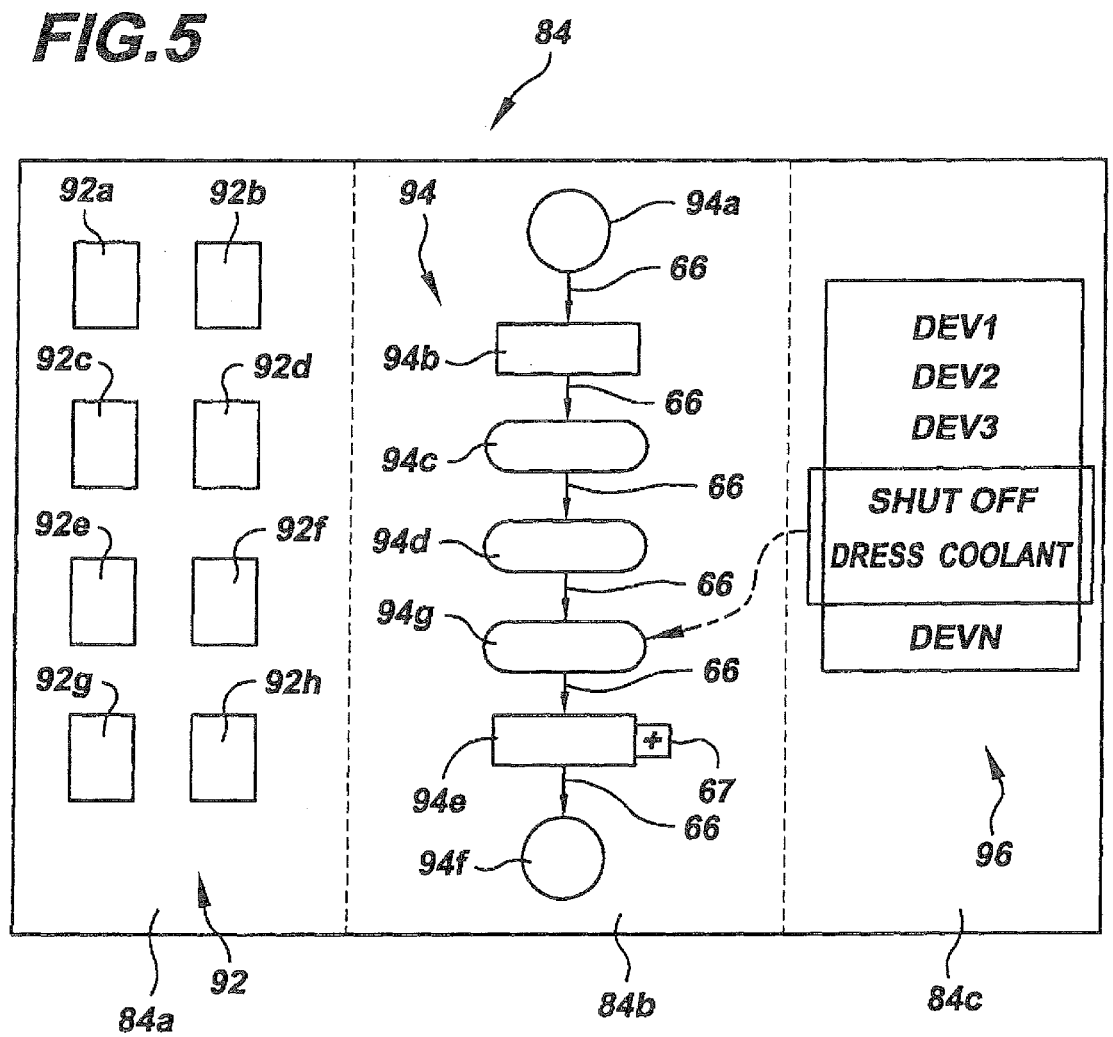

FIGS. 3-5 show a sequence of programmer screens illustrating creation and modification of a flowchart of operations to be programmed for execution by the machine tool. Screen 84 has a left portion 84a containing a "toolbox" menu 92 of icons representing types of machine device operations that can be inserted into the flowchart. Right screen portion 84c shows a device operation data display 96 that includes a drop-down list of the types of machine tool devices available, and the particular instruction for the selected device, DEV1, DEV2, DEV3, ... DEVN. Every device-type operation has a drop down list in its template. The contents of the drop down list comprise the various devices on the machine. That list varies from machine to machine, and can be as long or as short as necessary. The programmer software gets the list from the data it reads on start up from the setup file, as described above. The flowchart 94 is created in the working center screen portion 84b. In FIG. 3, toolbox menu 92 lists icons representing machine operations time 92a, event 92b, route 92c, decision 92d, user 92e, sub 92 f, toggle 92g and spindle 92h. Flowchart 94 lists in sequence a series of icons representing operations to be performed by the machine tool, start retract 94a, back off x-axis 94b, shut off wheel 94c, shut off cooling 94d, move z-axis home 94e and end retract 94f.

To select the operation insertion point into the flowchart, for example, by adding another operation into the middle of the existing sequence of flowchart 96, the user first highlights the operation to follow the new inserted operation, as shown in FIG. 3 by highlighted operation 94e. As shown in FIG. 4, the user selects a device type operation desired to be inserted, here toggle operation 92g, for example by clicking a cursor over the icon in screen portion 84a. A corresponding icon 94g is then created in flowchart 96 between operations 94d and 94e, and the user is prompted to insert the device operation command. To do so, the user selects from device operation data menu 96 the desired specific operation to be performed by the specific device. In FIG. 5 there is shown the user's selection of a shut off dress coolant operation, here by cursor click selection from a drop-down menu in screen portion 84c, and the copying of that operation into icon 96g in flowchart 96. The new sequence of operations represented in the modified flowchart 96 may then be executed by the machine tool, as discussed further below.

In order to confirm the sequence of commands selected by the operator, the system of the present invention includes a sequence generator algorithm or program to provide sequential ordering of the command functions. The sequence generator algorithm creates on display screen 84 a visual part program flowchart for the operator user to see, which flowchart includes connector line generation to connect the desired sequence of commands. For example, the operator may select an icon to connect from, and another icon to connect to, and the algorithm creates the line connecting the two. Connector lines are dynamically generated between the selected commands without the need for the user to specify the path they take through the arrangement of icons on programmer screen 84. These connector lines 66 are shown in FIGS. 3-5. The path-finding algorithm constructs connector lines that normally avoid the icon blocks themselves in the flowchart, so that the lines extend around the icons whenever possible. If necessary, the algorithm will reposition icons to facilitate drawing of the connector lines.

Figure 6:
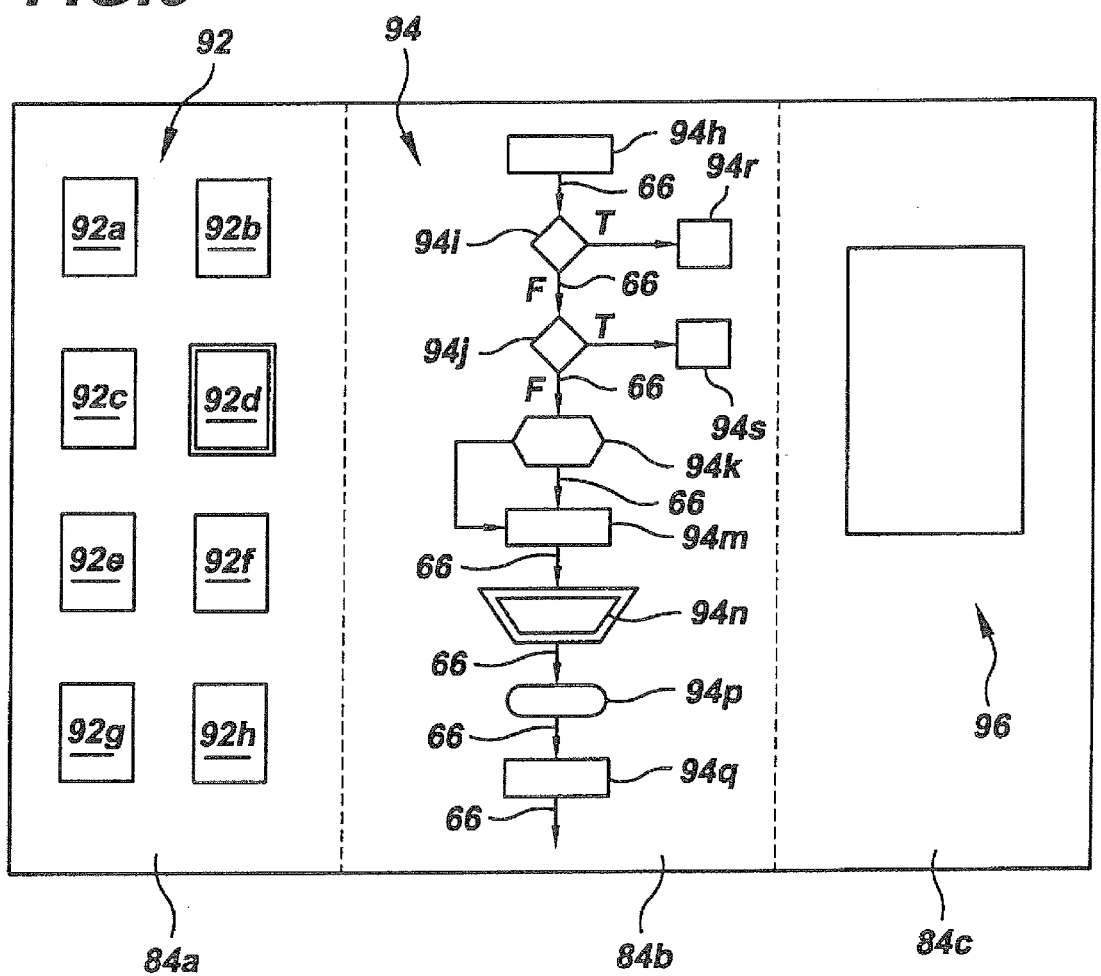
FIGS. 6-8 are views of the programmer screen showing the insertion of a new icon into the flowchart, and the re-routing of a connector line from the new icon.
Figure 7:
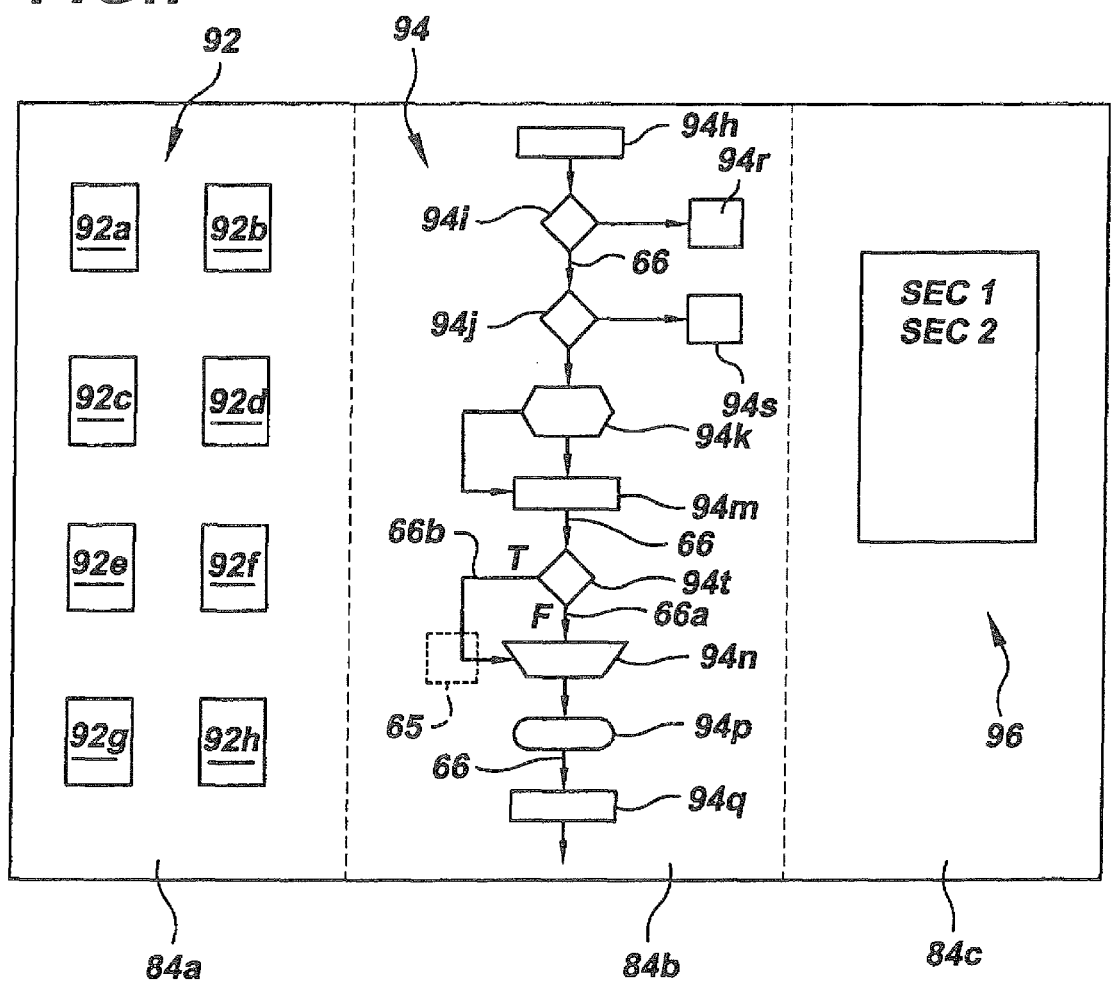
Figure 8:
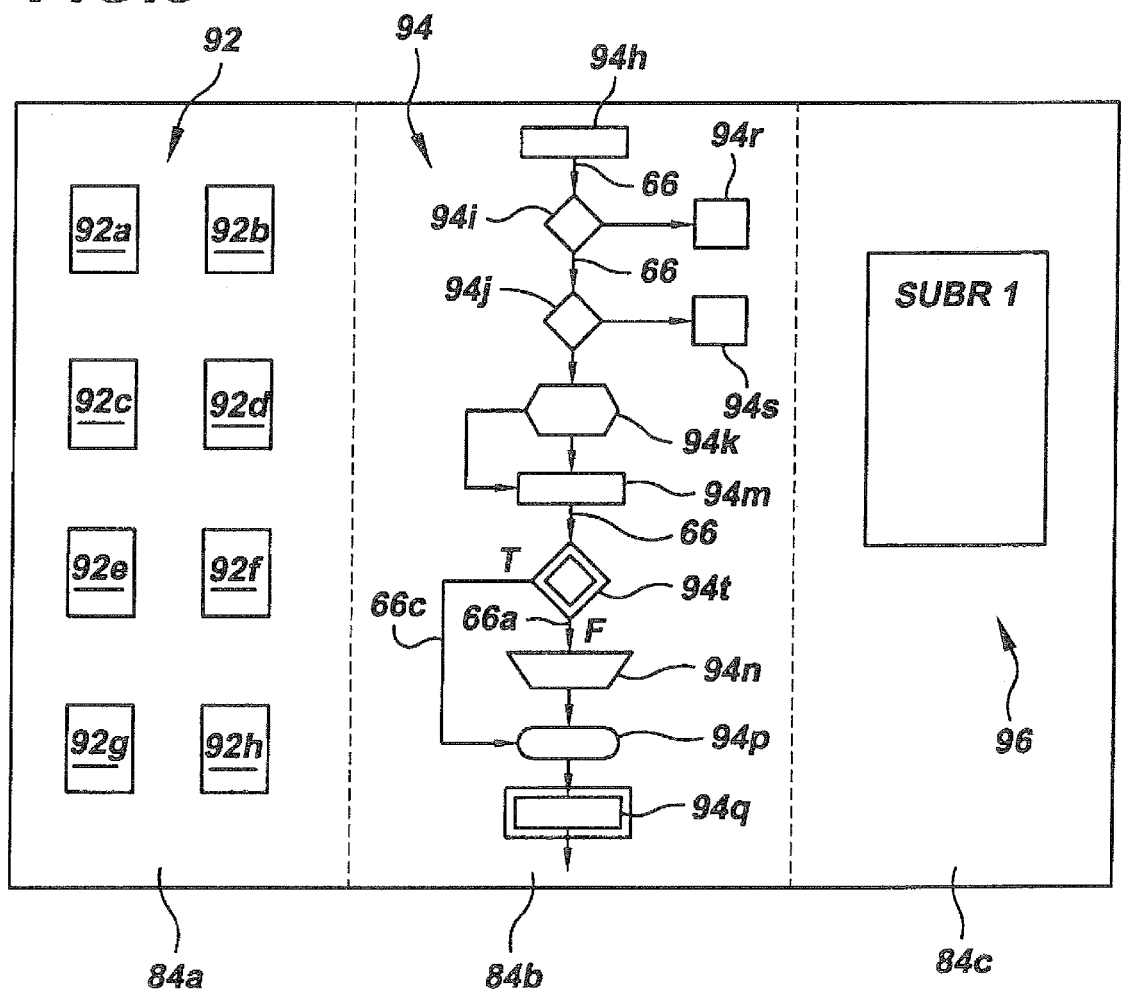

FIGS. 6-8 depict a programming sequence in conjunction with operation of the algorithm that creates the line connecting the command icons. In FIG. 6, flowchart 94 in screen working portion 84b shows the sequence of icons 94h-94s as connected by lines 66. The user has selected and highlighted decision operation 92d in menu portion 84a for insertion in front of highlighted operation 94n. In a decision operation, the drop-down list of registers available for switching program flow, i.e., branching, is also drawn from the setup file at start up. The number of such registers is unlimited, and their kind is limited only in the requirement that they be tied to a PMC address so that their value can be read while the machine tool executes the part program. In FIG. 7, the programmer software 42 has inserted the selected decision operation as icon 94t between command icons 94m and 94n. By default, the programmer software causes both the true (T) 66b and the false (F) 66a connector line branches to point to the immediately following operation 94n. The user will typically want to change one of those branches to point to some other operation, as depicted below. First, however, the user will fill in the data for their newly inserted decision operation 94t by dropping down the selection box 96, which in this case offers a selection of registers that depict binary data that can change or be changed as the machine runs, here shown as the state of selector switches SEL1, SEL2 on the machine. Other kinds of registers may also be supported.

After the user makes the selection for the new decision operation, one of the decision branches 66a, 66b needs to be moved. In this example, the user highlights a portion 65 of the connector line 66b for the true (T) branch and clicks the delete soft key 92h in menu portion 84a, which causes the programmer software to delete the selected connector line 66b. As shown in FIG. 8, the user highlights the decision operation 94t where the new line connector is to start, then clicks the connect soft key 92e in menu portion 84a. The user then clicks the destination operation 94p, and the control line algorithm draws the connecting line 66c from icon 94t to icon 94p. The algorithm draws the connector line 66c without crossing any icons. Line connectors can route upward to earlier operations in the sequence as well as downward to later ones.

Figure 9:
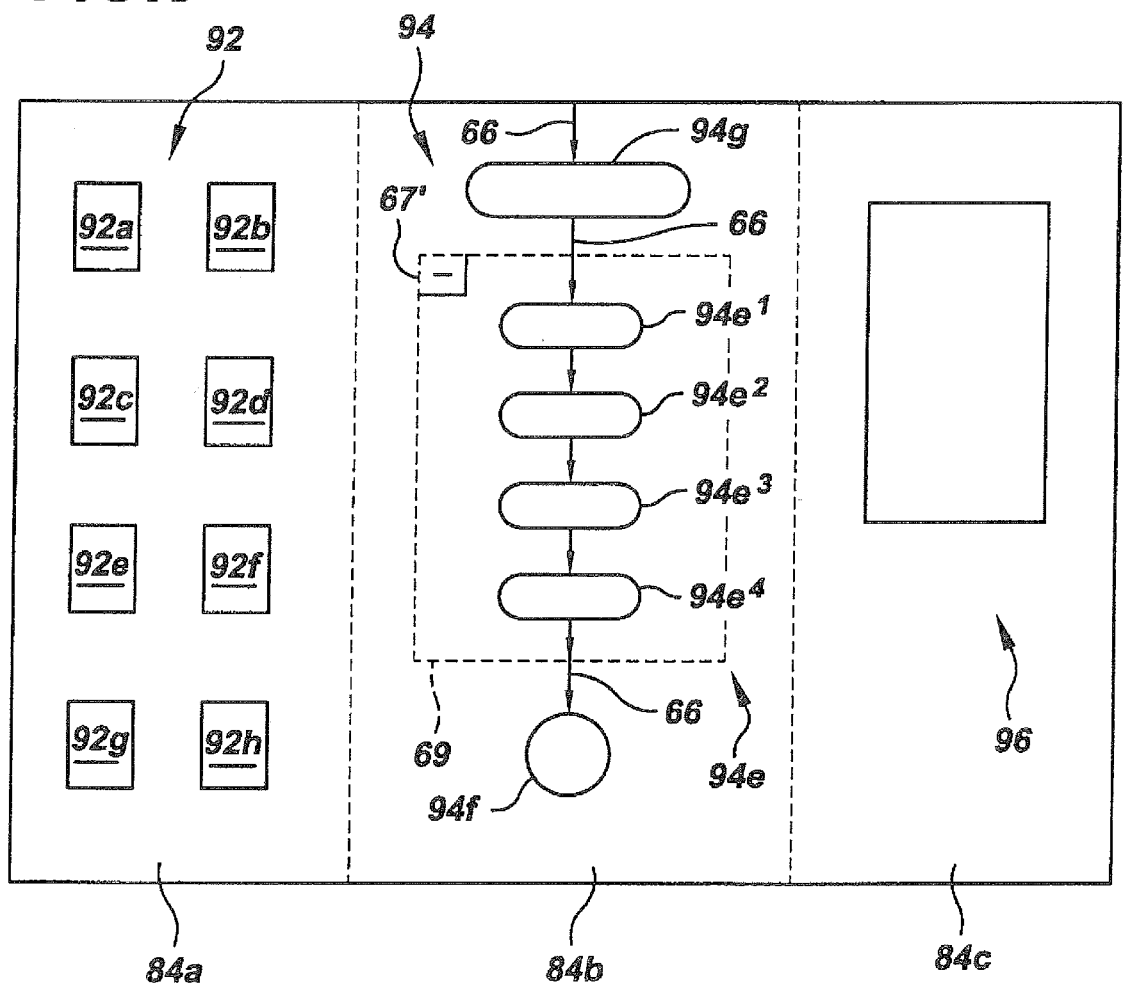
FIG. 9 is a view of the programmer screen showing the operation flowchart of a compound operation in the flowcharts of FIGS. 3-5.
Figure 10:
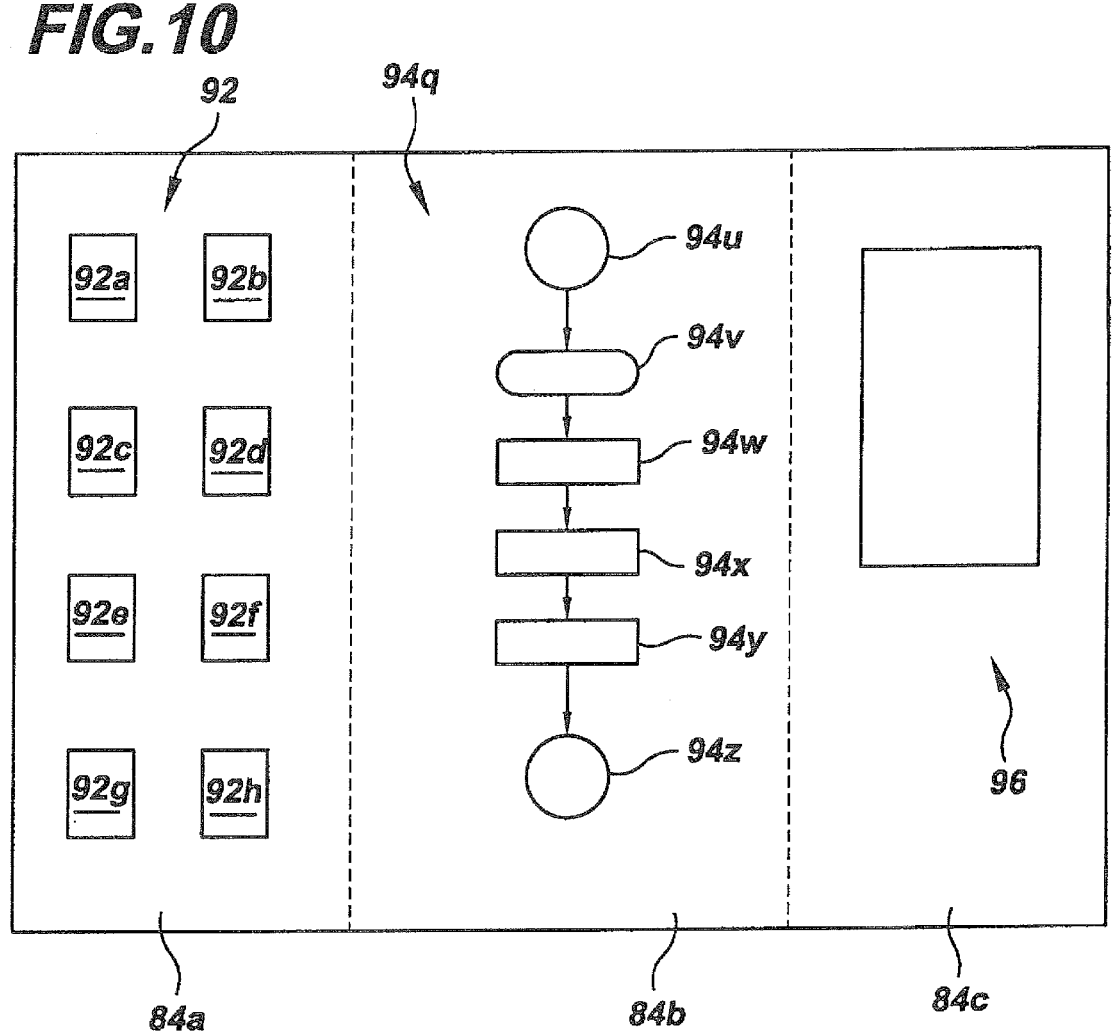
FIG. 10 is a view of the programmer screen showing the operation flowchart of a subroutine embodied in a single subroutine call icon in the flowchart of FIG. 8.

Some operations on the flowchart can be combined into a single compound operation. Referring back to FIGS. 3-5, the icon for operation command 94e has a plus sign 67 on it, indicating that it is a compound operation. The user may click the plus sign to see the operations or sub-program that the compound operation icon 94e represents. As shown in FIG. 9, the user has clicked on the plus sign, and causes the programmer software 42 to reveal that compound operation 94e contains a short sub-program, i.e., a flowcharted sequence of icons 94e1, 94e2, 94e3, 94e4, representing operation commands. The dotted line 69 surrounding the sub-program sequence 94e indicates the parent compound operation, and the operations 94e1, 94e2, 94e3, 94e4 in the sub-program are the child operations. The previous plus sign is now shown as a minus sign 67' that can also be clicked to return to the previous view.

Another way to employ sub-programs in the present invention is to write them as separate flowcharts, referred to as subroutines. For example, in FIG. 8 highlighted operation 94q is a subroutine call, and the menu 96 on the right portion 84c of the screen shows the name SUBR1 of the subroutine cycle that is called. The user can access the subroutine flowchart by selecting it from a list on a screen menu, and view the sequence of operation commands, as indicated by icons 94u-94z in FIG. 10. During running of the machine tool operations as established by the flowchart, when the NC module steps through the execution sequence and arrives at subroutine call 94q, execution is transferred to the indicated sub-routine in FIG. 10. After the machine tool execution is stepped all the way through the sequence of operations 94u-94z, execution is then transferred back to the calling program 94 (FIG. 8) at a point immediately following the subroutine call 94q. A major benefit of such subroutines in a part program is that they can be written once but called from many places in the program, thereby simplifying programming. Moreover, if they contain positions that must be captured on the machine, those positions will also only need to be captured once instead of everywhere they are used.

The programmer screen 84 therefore provides a selection grid of displayed icons in a flowchart, each with a scrollable operation sequence, operation details, and subprogram navigation. Users can navigate the graphically displayed designated sequence of icons by scrolling and clicking operations using a mouse or touch pad, by touching the touch-screen, or by any other input options available on user terminal 80. Additionally, users can jump to and from pre-designated subcycles by hyperlinking icons on the screen. The programmer software includes a sequence generator to indicate sequential ordering of the command functions represented by the sequence of images in the flowchart on the screen.

Using the constructed flowchart showing the connected sequence of machine tool commands, during the set up process the user may simulate any manual motions of the machine tool, or any automatic cycle selected, prior to running the part program flowchart on the machine tool.

The user from terminal 80 separately inputs to a tool offset structure program 36 in control memory the tool offsets, which tool offset data is transferred from the program to an XML file in disk storage 22a, as well as to NC module 50. Tool offset structure refers to the portion of the machine tool, or tooling fixture that holds the workpiece. Machine tools may use different tooling fixtures with the same cutting or grinding tool, or different cutting or grinding tools with the same tooling fixture, and consequently relative positioning between the cutting or grinding tool may be different for each combination. These different positioning values are referred to as tool offsets. The tool offsets may be stored in a startup file on disk storage 22a for subsequent reference.

Figure 11:
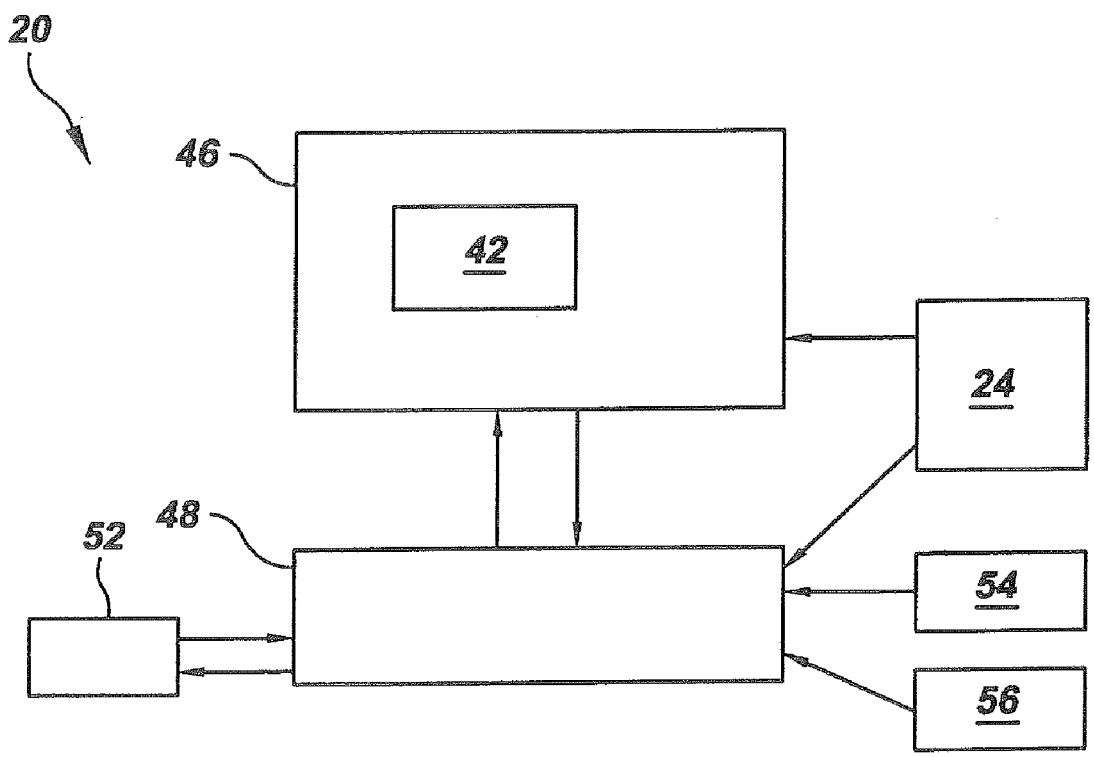
FIG. 11 is a schematic view of the preferred client and server portions of the operator interface control system of the present invention.

Final programming of the part program flowchart is performed by the working program structure 35 in controller 24. As shown in FIG. 11, programming is accomplished with two modules, a client 46 and a server 48. Both the client computer and the server computer may be located in the operator interface control 24. Server-client communication uses the http based XML-RPC protocol. The client computer runs the programmer software 42 that includes a connector line path find algorithm, and a connector line drawing algorithm, to presents the part program flowchart on the user terminal programmer screen, as described above. The client 46 then forwards the sequence of user generated commands to the server 48. The programmer software 42 on client computer may run independently from the remainder of the operator interface control 24, and may access connections to and communicate with workstations via conventional Ethernet or other network connections, either at the facility running the machine tool or elsewhere via the Internet. The programmer software 42 that creates the part program to be run on the machine tool may be run off line from the operator interface control 24 and machine tool, with or without the code conversion described below.

An XML program file accessed by the server, known as the template file 54, contains descriptions of program elements that will be added to the program file. Templates are interpreted real time, and allow for dynamic construction of final program elements, depending on the contexts of elements already written and the configuration files 56. The server 48 then handles the assembling of the XML program 52 in a text format based on the sequenced graphical format based flowchart commands generated in the client.

Returning to FIG. 2, once the setup of the XML program in working program structure 35 is completed, the XML program is transmitted to a compiler 40 that translates source code from a high level language into a lower level assembly or machine object code language used to control machine tool 70. Compiler module 40 takes the flowchart of sequenced commands from programmer screen 84, which is in XML text format, and converts it to G-code for transfer to NC module 50.

When required, the operator interface controller 24 subsequently commands compiler 40 to transmit the translated XML program, now in G-Code or other machine language, to the NC module 50 by means of routines stored in library 38. Tool offset data is also transferred to the NC module 50 by routines store in library 38. These routines from library 38 transmit commands to the NC module 50 and PMC module 60 to operate and control machine tool 60. NC module 50 transfers position and other machine information to the operator interface 24 by means of routines from library 38. The PMC module transmits machine status information to the operator interface 24 by means of routines in library 38.

Once the NC module 50 and PMC module 60 receive the commands necessary to execute the part program, the machine tool then performs the operations in the sequence established by the flowchart. The present machine tool control system preferably generates a relative position display consisting of a list of the axes on the machine and a number showing the position of each, visible on display 84. Any one of these displayed positions can be selected, and then set by the user to any desired value. Subsequent movement of the axis, typically via manual commands from the user, are reflected by changes in the displayed number associated with said axis, such that the distance the slide moves is accurately indicated by the number. This permits the machine to be used as a sophisticated measuring device, accurate to the resolutions of the axis feedback.

Figure 12:
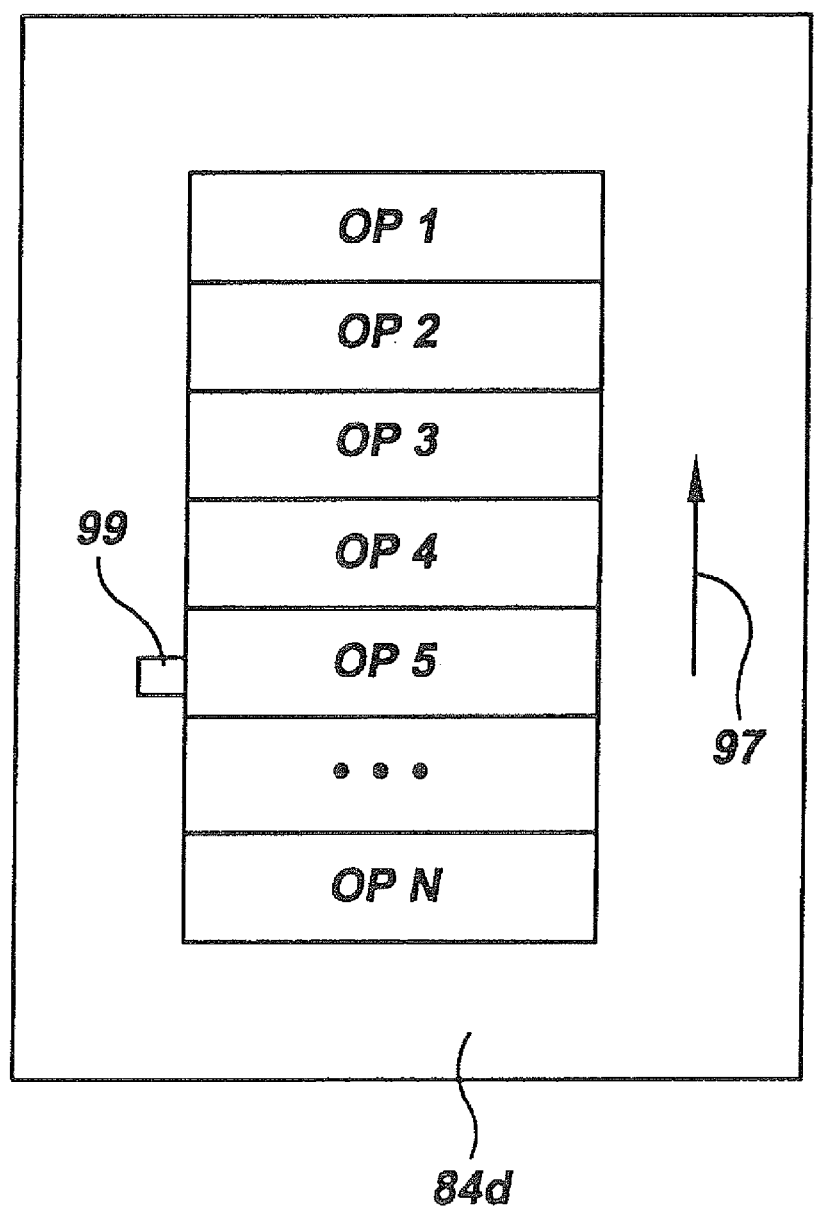
FIG. 12 is a view of a portion of operator interface screen during running of the machine tool showing automatic scrolling of the machine operation sequence established by the flowchart created by the operator.

During programmed automatic operation, machine tool control system 20 automatically scrolls the graphical display of the operation sequence, such that the operation currently being executed by the machine is vertically centered in the display. FIG. 12 shows a portion 84d of a programmer screen showing the operation sequence, established by the previously described flowchart, as it is run on the machine tool. The sequence of commands 98 is shown on the screen as a stack of boxes OP1, OP2, OP3, OP4, OP5 . . . OPN, with the currently executed operation OP5 indicated by block 99. As the operations are executed, the stack 98 scrolls upward, as indicated by arrow 97, so that the operations adjacent to the current operation are displayed. If multiple paths are being run, the display will show the operation sequence for each different path (i.e., device) simultaneously on the screen. Adjacent to the current operation is displayed a counter showing the time the operation has taken since it began. Also shown for each path is runtime data such as throughput (e.g., last and current elapsed cycle time, part counters (e.g., resettable and total), process data (e.g., feed rate, rate override, wheel remaining, dress counter), and spindle data (e.g., wheel speed, work speed, current wheel power). When execution of the operation is complete, the display automatically scrolls both the operation sequence and its adjacent time display so that the sequence of previously executed operations and their respective total times can be viewed for analysis.

Figure 13:
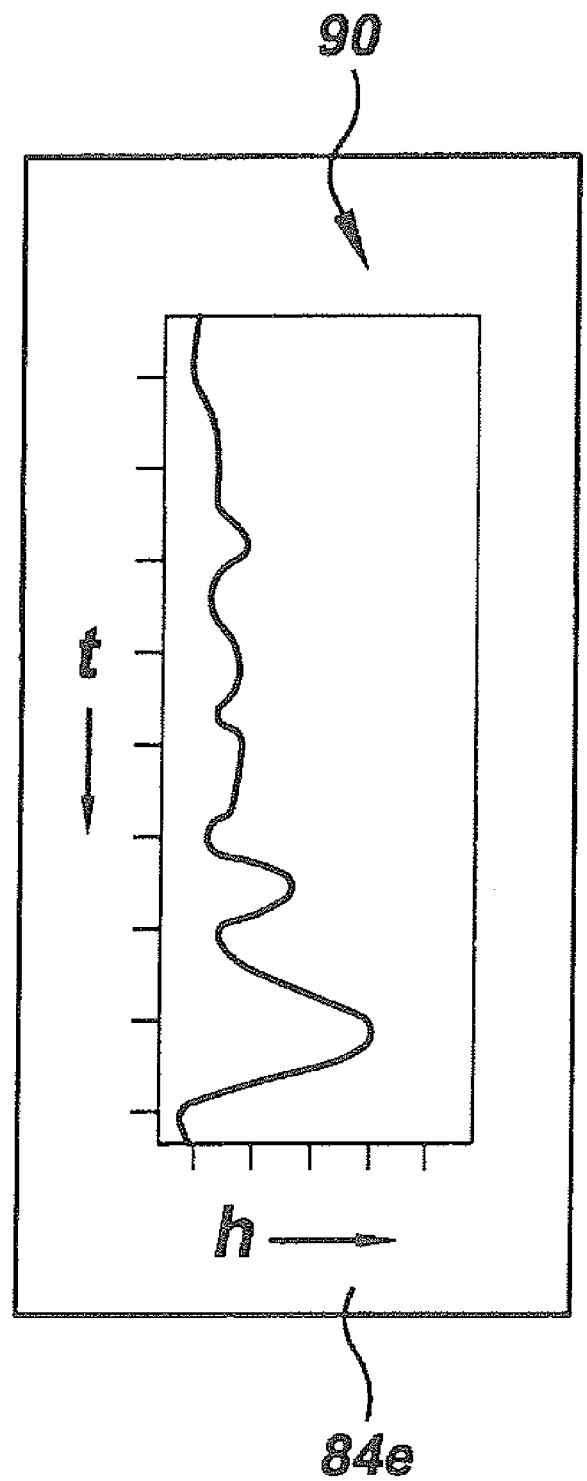
FIG. 13 is a view of a portion of operator interface screen during running of the machine tool showing time dependent values of a device on the machine tool.

The present invention also preferably includes a strip chart-like display of a continuously scrolling rectangular field upon which there is drawn one or more lines or bars that reflect the changing values, compared to a horizontal scale, of data or corresponding inputs to the control. An example of the strip chart display is shown in FIG. 13. Programmer screen portion 84g shows strip chart 90 showing values of spindle horsepower, for example, on the horizontal axis h as a function of time value t on the vertical axis. The effect is one of a time-based line or bar graph. The vertical scrolling speed is adjustable by the operator, in effect becoming an adjustment of the time scale of the graph. The strip chart can be configured to display the values of various inputs, and its parameters, such as the horizontal and vertical scales, the background and foreground colors, or the type of line or bar, can all be adjusted by the user.

Further, if work pieces leaving the machine are determined by measurement to have been ground or cut outside of specified limits, then the user may utilize a size correcting function to offset the axis position(s) of specified operations so as to correct the resultant work-pieces back to within the specified limits.

Any pertaining documentary files stored on storage disks accessible by the operator interface control can be viewed by users on the display screen, including text files and Auto-Cad drawings. These can be configured as hyperlink targets and accessed quickly from help screens available to the operator user on display 84. When help is requested, the system may also display information related to the context from which the request is made, as well as a hyperlinking table of contents. When employed, the operator user is initially hyperlinked and zoomed in to the specific position in the file, to provide context sensitive help.

Machine alarms indicating machine tool problems may be listed in a text file read by the operator interface control. As alarms occur they are displayed on the screen and appropriate options are made available to the user. All alarms are logged in a separate file, along with the time and date they occurred. The operator interface control can display this history log in a grid that allows sorting of the entries by alarm name, or by time or date of occurrence. A similar history log is created for cycle logs storing all of the past machine operations. So that the alarm and cycle histories do not use up excessive storage space, the operator user may limit the number and size of each history file and the number of alarms stored in each of the history files. When the number of history files is exceeded in each category, ie., alarm log or cycle log, the oldest history file is overwritten.

Accordingly, the present invention provides a machine tool control system that reduces the complexity of programs required for inputting information and commands, and increases flexibility of creating and using programmed cycles of commands. The machine tool control system is able to access substantially all of the devices on the machine tool, and is able to be used on a variety of different machine tools.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of controlling a machine tool comprising:
   providing a machine tool controller adapted to receive commands from an input source and provide control instructions to a machine tool based at least in part on the commands;
   providing an operator interface for inputting commands to the controller, the interface including a display screen having images thereon of command functions, the command functions including single operations and compound operations having a plurality of single operations in a defined sequence initially provided and visible on a menu portion of the display screen, the images being selectable on the screen to place into a sequence of command functions selected by an operator, the interface further including a sequence generator to indicate sequential ordering of the command functions represented by the sequence of images on the screen;
   selecting a plurality of images representing the command functions that the operator desires to have performed by the machine tool, the command functions including at least one compound operation containing a plurality of single operations in a defined sequence;
   copying the selected images from the menu portion of the display screen onto a working portion of the screen;
   designating a sequence of the images on the working portion of the screen representing the order in which the operator desires the machine tool to perform the selected command functions, the working portion of the screen including an indication that the at least one compound operation contains a defined sequence of single operations without showing in the sequence of images on the working portion of the screen the defined sequence of single operations in the at least one compound operation; and
   using the operator controller sequence generator, translating the designated sequence of selected images into a sequence of commands and inputting the sequence of commands into the controller to control the machine tool to perform the selected command functions in the order designated by the operator.

2. The method of claim 1 including indicating on the display screen the designated order of the selected images in the order in which the operator desires the machine tool to perform the selected command functions.

3. The method of claim 1 further including using the sequence generator to generate connector lines visible on the display screen connecting the sequence of selected images in the order designated by the operator.

4. The method of claim 3 wherein the connector lines visible on the display screen avoid images other than the selected images.

5. The method of claim 1 further including providing on the interface display screen a graphical display of one or more operations being executed by the machine, wherein the graphical display of operation sequence is automatically scrolled on the display screen during programmed operation of the commands.

6. The method of claim 1 further including providing on the interface display screen a graphical display of multiple input parameters to the machine tool as a function of time of operation of the machine tool, wherein the time scale is adjustable by the operator.

7. The method of claim 6 wherein the graphical display is a line or bar graph.

8. The method of claim 1 wherein the images of compound operation command functions representing a plurality of single operations in a defined sequence alternately hide and view the defined sequence of single operations in the at least one compound operation, and including selecting the image to hide the defined sequence of single operations and selecting the image to view the defined sequence of single operations in the at least one compound operation.

9. The method of claim 5 further including a compiler, and including using the compiler to convert the sequence of commands to G-code usable by a numerical control module of the machine tool.

10. The method of claim 1 wherein the operator controller sequence generator translates the designated sequence of selected images into a sequence of commands off line from the machine tool.

11. The method of claim 9 wherein the designated sequence of selected images representing the sequence of commands is transmitted to the controller over a network.

12. The method of claim 1 further including creating in a file a history log of machine operation or alarm events, limiting the number and size of each history file and the number of events stored in each history file and, when the number of history files is exceeded, overwriting the oldest history file.

13. A control system for a machine tool comprising:
a machine tool controller adapted to receive commands from an input source and provide control instructions to a machine tool based at least in part on the commands; and
an operator interface for inputting commands to the controller, the interface including a display screen having images thereon of individual command functions, the command functions including single operations and compound operations having a plurality of single operations in a defined sequence initially provided and visible on a menu portion of the display screen, the images being selectable on a working portion of the screen to place into a sequence of command functions selected by an operator, the working portion of the screen including an indication that the at least one compound operation contains a defined sequence of single operations without showing in the sequence of images on the working portion of the screen the defined sequence of single operations in the at least one compound operation, the interface further including a sequence generator to indicate sequential ordering of the command functions represented by the sequence of images on the screen, whereby a sequence of images on the screen selected by the operator is translated by the operator controller sequence generator into a sequence of commands to be inputted into the controller.

14. The control system of claim 13 wherein the sequence generator is further adapted to generate connector lines visible on the display screen connecting the images in the sequence selected by the operator.

15. The control system of claim 13 wherein the connector lines visible on the display screen avoid images other than the selected images.

16. The control system of claim 7 wherein the system is further adapted to provide on the interface display screen a graphical display one or more operations being executed by the machine, wherein the graphical display of operation sequence is automatically scrolled on the display screen during programmed operation of the commands.

17. The control system of claim 13 wherein the system is further adapted to provide on the interface display screen a graphical display of multiple input parameters to the machine tool as a function of time of operation of the machine tool, wherein the time scale is adjustable by the operator.

18. The control system of claim 17 wherein the graphical display is a line or bar graph.

19. The control system of claim 13 wherein the images of compound operation command functions representing a plurality of single operations in a defined sequence alternately hide and view the defined sequence of single operations in the at least one compound operation.

20. The control system of claim 13 further including a compiler adapted to convert the sequence of commands to G-code usable by a numerical control module of the machine tool.

21. The control system of claim 13 wherein the operator controller sequence generator is adapted to translates the designated sequence of selected images into a sequence of commands off line from the machine tool.

22. The control system of claim 13 wherein the operator interface includes an image of a command function having a true-false decision operation, the image of a command function having a true-false decision operation upon insertion into the sequence of command functions generating connector lines visible on the display screen, representing true and false branches, connecting to an image of a command function immediately following the image of the command function having the true-false decision operation, at least one of the connector lines representing true and false branches being movable by the operator from the immediately following command function image to an earlier or later command function image in the designated sequence of images on the screen.

23. A method of controlling a machine tool comprising:
providing a machine tool controller adapted to receive commands from an input source and provide control instructions to a machine tool based at least in part on the commands;
providing an operator interface for inputting commands to the controller, the interface including a display screen having images thereon of command functions, the command functions including single operations and compound operations having a plurality of single operations in a defined sequence, the images being selectable on the screen to place into a sequence of command functions selected by an operator, the interface further including a sequence generator to indicate sequential ordering of the command functions represented by the sequence of images on the screen;
selecting a plurality of images representing the command functions that the operator desires to have performed by the machine tool, the command functions including at least one compound operation containing a plurality of single operations in a defined sequence;
designating a sequence of the images on a portion of the screen representing the order in which the operator desires the machine tool to perform the selected command functions, the screen including an indication that the at least one compound operation contains a defined sequence of single operations without showing in the sequence of images on the working portion of the screen the defined sequence of single operations in the at least one compound operation;
providing on the operator interface an image of a command function having a true-false decision operation;
selecting the image of a command function having a true-false decision operation;
inserting the image of a command function having a true-false decision operation into a designated sequence of images on the screen representing the order of selected command functions;
by default generating connector lines visible on the display screen, representing true and false branches, to connect to an image of a command function immediately following the image of the command function having the true-false decision operation; and
moving at least one of the connector lines representing true and false branches from the immediately following command function image to an earlier or later command function image in the designated sequence of images on the screen; and
using the operator controller sequence generator, translating the designated sequence of selected images into a sequence of commands and inputting the sequence of commands into the controller to control the machine tool to perform the selected command functions in the order designated by the operator.

24. The method of claim 23 wherein at least one of the connector lines representing true and false branches is moved from the immediately following command function image to an earlier command function image in the designated sequence of images on the screen.

25. The method of claim 23 wherein at least one of the connector lines representing true and false branches is moved from the immediately following command function image to a later command function image in the designated sequence of images on the screen.

* * * * *